US012199345B2

(12) United States Patent
Sun et al.

(10) Patent No.: US 12,199,345 B2
(45) Date of Patent: Jan. 14, 2025

(54) BASE STATION ANTENNAS HAVING COMPACT DUAL-POLARIZED BOX DIPOLE RADIATING ELEMENTS THEREIN THAT SUPPORT HIGH BAND CLOAKING

(71) Applicant: Outdoor Wireless Networks LLC, Claremont, NC (US)

(72) Inventors: Bin Sun, Suzhou (CN); Bo Wu, Allen, TX (US); Yuemin Li, Suzhou (CN); Peter J. Bisiules, LaGrange Park, IL (US); Mohammed Vatankhah Varnoosfaderani, Plano, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 166 days.

(21) Appl. No.: 18/245,141

(22) PCT Filed: Sep. 16, 2021

(86) PCT No.: PCT/US2021/050650
§ 371 (c)(1),
(2) Date: Mar. 13, 2023

(87) PCT Pub. No.: WO2022/072148
PCT Pub. Date: Apr. 7, 2022

(65) Prior Publication Data

US 2023/0361475 A1 Nov. 9, 2023

Related U.S. Application Data

(60) Provisional application No. 63/085,334, filed on Sep. 30, 2020.

(51) Int. Cl.
*H01Q 15/00* (2006.01)
*H01Q 1/24* (2006.01)
(Continued)

(52) U.S. Cl.
CPC ......... *H01Q 15/0013* (2013.01); *H01Q 1/246* (2013.01); *H01Q 1/521* (2013.01); *H01Q 5/42* (2015.01); *H01Q 21/24* (2013.01)

(58) Field of Classification Search
CPC .... H01Q 15/0013; H01Q 1/246; H01Q 1/521; H01Q 5/42; H01Q 21/24; H01Q 5/48
See application file for complete search history.

(56) References Cited

U.S. PATENT DOCUMENTS 6,028,563 A * 2/2000 Higgins ................. H01Q 1/246 343/810
6,313,809 B1 * 11/2001 Gabriel ................. H01Q 21/24 343/797
(Continued)

FOREIGN PATENT DOCUMENTS

CN 204029994 U 12/2014
CN 111725618 A 9/2020

OTHER PUBLICATIONS

Notification of Transmittal of the International Search Report and the Written Opinion of the International Searching Authority, or the Declaration, in corresponding PCT Application No. PCT/US2021/050650 (Jan. 4, 2022).

*Primary Examiner* — Daniel D Chang
(74) *Attorney, Agent, or Firm* — Myers Bigel, P.A.

(57) ABSTRACT

A box dipole radiating element uses a compact quad arrangement of substantially coplanar radiating arms to support slant-polarized radiation, in response to differential-mode currents generated along four sides thereof and in response to common-mode currents, which may be generated in substantially the same plane as the differential-mode currents. A feed signal routing network is provided, which includes a feed signal routing substrate on portions of the radiating arms, first through fourth signal traces on a forward face of the substrate, and first through fourth ground plane
(Continued)

segments on a rear face of the substrate. These first through fourth ground plane segments are capacitively coupled to the radiating arms. Each of the signal traces receives a corresponding feed signal, and spans a corresponding air gap between a pair of the radiating arms.

20 Claims, 11 Drawing Sheets

(51) Int. Cl.
*H01Q 1/52* (2006.01)
*H01Q 5/42* (2015.01)
*H01Q 21/24* (2006.01)

(56) References Cited

U.S. PATENT DOCUMENTS

| | | | | |
|---|---|---|---|---|
| 7,688,271 | B2 * | 3/2010 | Cao .......................... | H01Q 9/28 343/810 |
| 2016/0336656 | A1 | 11/2016 | Prinsloo et al. | |
| 2018/0337462 | A1 | 11/2018 | Vollmer et al. | |

* cited by examiner

BASE STATION ANTENNAS HAVING COMPACT DUAL-POLARIZED BOX DIPOLE RADIATING ELEMENTS THEREIN THAT SUPPORT HIGH BAND CLOAKING

REFERENCE TO PRIORITY APPLICATION

This application is a 35 U.S.C. § 371 national stage application of PCT Application No. PCT/US2021/050650, filed Sep. 16, 2021, which claims priority under 35 U.S.C. § 119 to U.S. Provisional Application Ser. No. 63/085,334, filed Sep. 30, 2020, the disclosure of which is hereby incorporated herein by reference. The above-referenced PCT Application was published in the English language as International Publication No. WO 2022/072148 A1 on Apr. 7, 2022.

FIELD OF THE INVENTION

The present invention relates to radio communications and antenna devices and, more particularly, to dual-polarized antennas for cellular communications and methods of operating same.

BACKGROUND

Cellular communications systems are well known in the art. In a typical cellular communications system, a geographic area is often divided into a series of regions that are commonly referred to as "cells", which are served by respective base stations. Each base station may include one or more base station antennas (BSAs) that are configured to provide two-way radio frequency ("RF") communications with mobile subscribers that are within the cell served by the base station. In many cases, each base station is divided into "sectors." In perhaps the most common configuration, a hexagonally shaped cell is divided into three 120° sectors, and each sector is served by one or more base station antennas, which can have an azimuth Half Power Beam Width (HPBW) of approximately 65° to thereby provide sufficient coverage to each 120° sector. Typically, the base station antennas are mounted on a tower or other raised structure and the radiation patterns (a/k/a "antenna beams") are directed outwardly therefrom. Base station antennas are often implemented as linear or planar phased arrays of radiating elements.

Furthermore, in order to accommodate an increasing volume of cellular communications, cellular operators have added cellular service in a variety of frequency bands. While in some cases it is possible to use a single linear array of so-called "wide-band" radiating elements to provide service in multiple frequency bands, in other cases it may be necessary to use different linear arrays of radiating elements in multi-band base station antennas to support service in the additional frequency bands.

One conventional multi-band base station antenna design includes at least one linear array of relatively "low-band" radiating elements, which can be used to provide service in some or all of a 617-960 MHz frequency band. In addition, to reduce costs and provide for more compact antennas, each of these "low-band" radiating elements may be configured to surround a corresponding relatively "high-band" radiating element that is used to provide service in some or all of a 1695-2690 MHz frequency band.

A conventional box dipole radiating element may include four dipole radiators that are arranged to define a box-like shape. The four dipole radiators may extend in a common plane, and may be mounted forwardly of a reflector that may extend parallel to the common plane. So called feed stalks may be used to mount the four dipole radiators forwardly from the reflector, and may be used to pass RF signals between the dipole radiators and other components of the antenna. In some of these conventional box dipole radiating elements, a total of eight feed stalks (4×2) may be provided and may connect to the box dipole radiators at the corners of the box.

For example, as illustrated by FIGS. 1A-1B, a conventional multi-band radiator 10 for a base station antenna may include a relatively high band radiating element 10*a* centered within and surrounded on four sides by a relatively low band radiating element 10*b*, which is configured as a box dipole radiating element ("box dipole") including four dipole radiators that are arranged to define a box shape when viewed from the front. RF signals may be fed to the four dipole radiators of a conventional box dipole radiating element 10*b* through the feed stalks at two opposed and "excited" corners of the "box," as is shown in FIG. 1A. In response, common mode (CM) currents are forced automatically onto the feed stalks at the two diametrically opposed non-excited corners of the box dipole, in response to differential mode (DM) currents that are fed to the two excited "differential mode" ports. And, because these common mode currents radiate as a monopole on these "non-excited" feed stalks, the overall radiation pattern of the box dipole 10*b* is actually a combination of two dipoles and two monopoles (with "nulls"), as illustrated by the simplified radiation patterns of FIG. 1B. Unfortunately, the radiation stemming from monopole operation can be highly undesirable when designing a box dipole radiator. For example, although having common mode currents radiating at the same time with differential mode currents in the box dipole 10*b* can be expected to slightly narrow the azimuth HPBW of the box dipole 10*b* because of the presence of two nulls caused by the monopole radiators, a concurrent co-polarization radiation pattern of the box dipole 10*b* can be expected to demonstrate rising "shoulders" in the radiation pattern, which refer to radiation emitted outside the main lobe in the azimuth plane. These shoulders can significantly degrade overall antenna performance.

Referring now to FIGS. 2A-2B, conventional cross-polarized box dipole radiating elements 20, 20' (with inwardly slanted feed stalks and hence slanted monopoles) are illustrated, which operate in a similar manner relative to the box dipole radiating element 10*b* of FIG. 1A. Thus, as shown, the excitation of a first pair of diametrically opposite "differential mode" ports of the box dipole radiating elements 20, 20' can induce common mode (CM) currents in a corresponding second pair of ports, which results in monopole-type radiation from a pair of slanted monopoles. And, as further shown by FIG. 2A, this monopole-type radiation can result in the generation of undesired "shoulders" (S) in an azimuth radiation pattern associated with the box dipole 20.

SUMMARY

A box dipole radiating element of a base station antenna may support relatively low-band radiation using a compact quad arrangement of substantially coplanar radiating arms configured to support slant-polarized radiation. This slant-polarized radiation occurs in response to differential-mode currents generated along four sides thereof and in response to common-mode currents generated in substantially the same plane as the differential mode currents. According to some embodiments of the invention, the common-mode currents traverse from one corner of the quad arrangement of radiating arms to another diametrically opposite corner of the quad arrangement of the radiating arms. In addition, each of the first through fourth radiating arms may be configured as a four-sided trapezoidal-shaped radiating arm. And, the four outermost sides of the quad arrangement of radiating arms include: (i) first and second opposing sides, which are spaced apart from each other at a first distance, and (ii) third and fourth opposing sides, which are spaced apart from each other at the first distance. Accordingly, the four outermost sides of the quad arrangement of radiating arms may lie along sides of a rectangle (e.g., square) when viewed from a plan perspective. Each of the radiating arms may also be configured to have a shortest side and a longest side, which extend parallel to each other, and first and second radially diverging sides that intersect respective first and second ends of the shortest side at an obtuse angle and intersect respective first and second ends of the longest side at an acute angle.

The radiating arms may also be configured to provide relatively high-band cloaking using in-series inductors, which are integrated into each of four outermost sides of the quad arrangement of radiating arms. In some cases, three of the four sides of each radiating arm may also include an in-series inductor. Among other things, these inductors operate to maintain sufficient electrical length of the radiating arms, and further contribute to a reduction in overall size of the box dipole radiating element.

According to further embodiments of the invention, a shortest side of each of the radiating arms has at least one feed signal through hole therein. A plurality of coaxial cables are also provided, which extend through corresponding ones of the feed signal through holes in the radiating arms. A feed signal routing substrate is also provided on forward facing surfaces of the shortest sides of the radiating arms. In some cases, a center of the feed signal routing substrate, which may be octagon-shaped, is aligned to a center of the quad arrangement of substantially coplanar radiating arms. The feed signal routing substrate includes first through fourth signal traces on a forward facing surface thereof. The first signal trace is configured to span an air gap between the first and second radiating arms, the second signal trace is configured to span an air gap between the second and third radiating arms, the third signal trace is configured to span an air gap between the third and fourth radiating arms; and the fourth signal trace is configured to span an air gap between the fourth and first radiating arms. First through fourth ground plane segments are also provided on a rear facing surface of the feed signal routing substrate, which may be configured as a double sided printed circuit board (PCB). A plurality of the first through fourth ground plane segments are electrically coupled to corresponding ones of the signal traces, and capacitively coupled (e.g., across an air gap and solder mask "dielectric" (e.g., resin layer)) to respective ones of the shortest sides of the radiating arms, to thereby provide a feed signal routing network with high isolation.

A plurality of coaxial cables may also be provided, which have center conductors soldered into respective plated through holes within the printed circuit board. In particular, the plurality of coaxial cables include four coaxial cables having center conductors solder bonded to respective ones of the first through fourth signal traces on the forward facing surface of the feed signal routing substrate. The quad arrangement of radiating arms may also be supported above a reflector by a feed stalk, and the plurality of coaxial cables may extend a length of the feed stalk and through the feed signal through holes within the radiating arms. The feed stalk may include first through fourth vertical supports attached to respective first through fourth radiating arms. In particular, the first through fourth vertical supports may be contiguous with a corresponding one of the first through fourth radiating arms, and may be formed from stamped metal.

According to another embodiment of the invention, a box dipole radiating element includes: (i) a quad arrangement of radiating arms configured to support slant-polarized radiation responsive to differential-mode currents generated along four sides thereof, and (ii) a feed signal routing network, which includes a feed signal routing substrate on portions of forward facing surfaces of first through fourth radiating arms within the quad arrangement. This feed signal routing substrate includes first through fourth signal traces on a forward facing surface thereof, and first through fourth ground plane segments on a rear facing surface thereof. The first through fourth ground plane segments are capacitively coupled to respective ones of the first through fourth radiating arms. The first signal trace spans an air gap between the first and second radiating arms, the second signal trace spans an air gap between the second and third radiating arms, the third signal trace spans an air gap between the third and fourth radiating arms, and the fourth signal trace spans an air gap between the fourth and first radiating arms. In particular, the first signal trace spans an air gap between a radially diverging side of the first radiating arm and a radially diverging side of the second radiating arm, which extends generally parallel to the radially diverging side of the first radiating arm. Similarly, the second through fourth signal traces may also span air gaps between corresponding ones of the radially diverging sides of the radiating arms.

In addition, first through fourth coaxial feed cables may be provided, which have center conductors electrically coupled to respective ones of the first through fourth signal traces. For example, the center conductors may be electrically coupled by plated through holes within the feed signal routing substrate to corresponding ones of the first through fourth signal traces. An opposing end of each of these signal traces may also be electrically coupled by a plated, and filled, through hole to a corresponding ground plane segment, which may be capacitively coupled to a respective radiating arm.

According to still further embodiments of the invention, a box dipole radiating element includes a quad arrangement of radiating arms having four outermost sides that lie along sides of a square when viewed from a plan perspective, and first through fourth pairs of spaced-apart and radially diverging sides that terminate at the four outermost sides. A feed signal routing substrate is provided on portions of forward facing surfaces of first through fourth radiating arms within the quad arrangement. The feed signal routing substrate includes first through fourth signal traces on a forward facing surface thereof, which span air gaps between respective ones of the first through fourth pairs of radially diverging sides, which may be substantially coplanar with the four outermost sides.

In some additional embodiments of the invention, the quad arrangement of radiating arms are supported above a reflector by a feed stalk having a plurality of coaxial cables mounted thereto. These cables, which extend through openings within the quad arrangement of radiating arms, have center conductors that are solder bonded into through holes within the feed signal routing substrate, and electrically connected to respective ones of the first through fourth signal traces. A plurality of the first through fourth signal traces are electrically connected to respective first through fourth ground plane segments, which extend on a rear facing surface of the feed signal routing substrate. The first through fourth ground plane segments are capacitively coupled across an air gap, and possibly PCB solder mask (e.g., dielectric resin), to respective first through fourth radiating arms within the quad arrangement.

DETAILED DESCRIPTION OF EMBODIMENTS

Figure 1A:
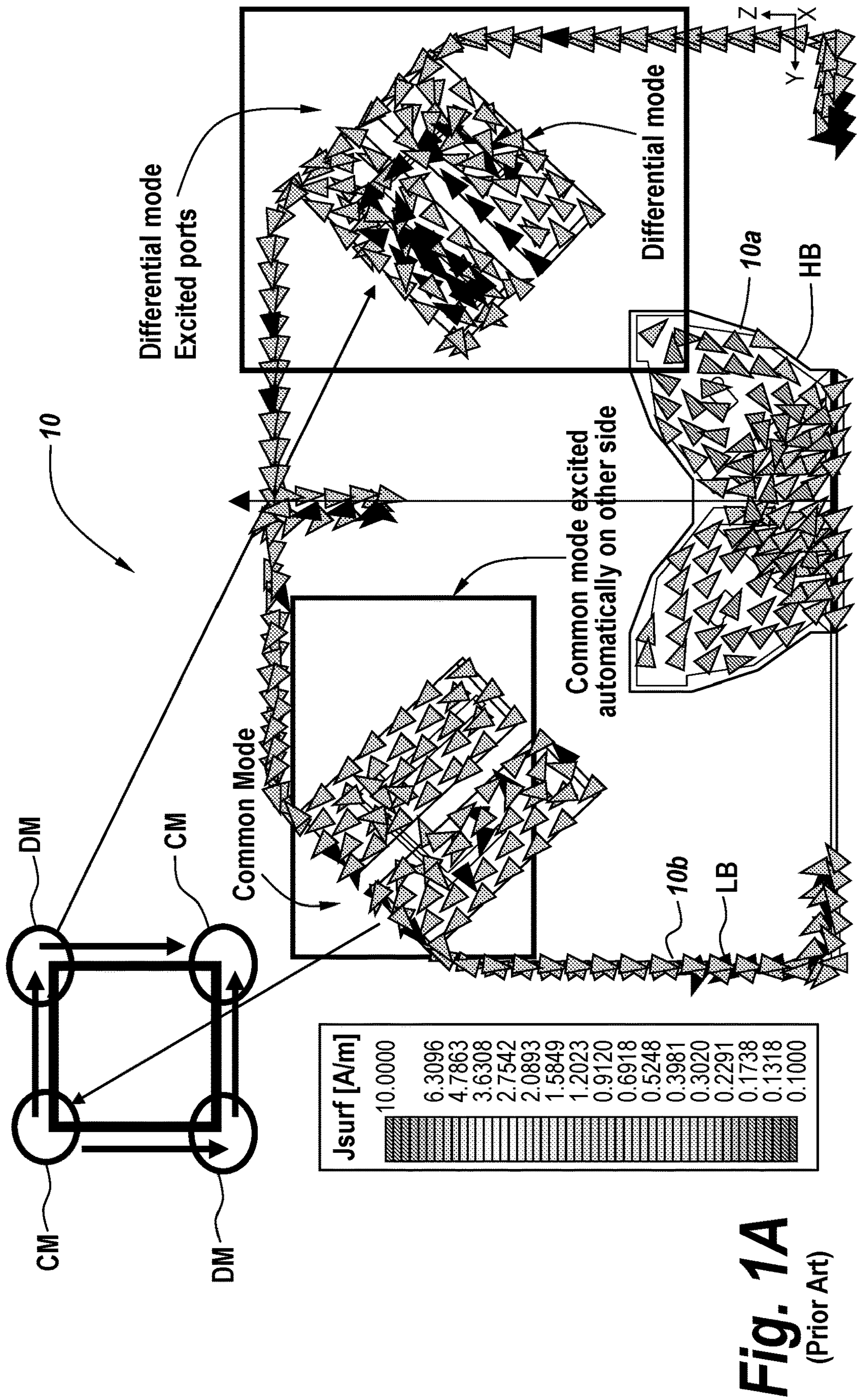
Fig. 1A (Prior Art)
FIG. 1A is a schematic diagram of a conventional box dipole radiating element that includes a partial perspective view of the box dipole radiating element showing simulated differential mode and common mode currents therein, according to the prior art and a schematic front view of the box dipole radiating element.
Figure 1B:
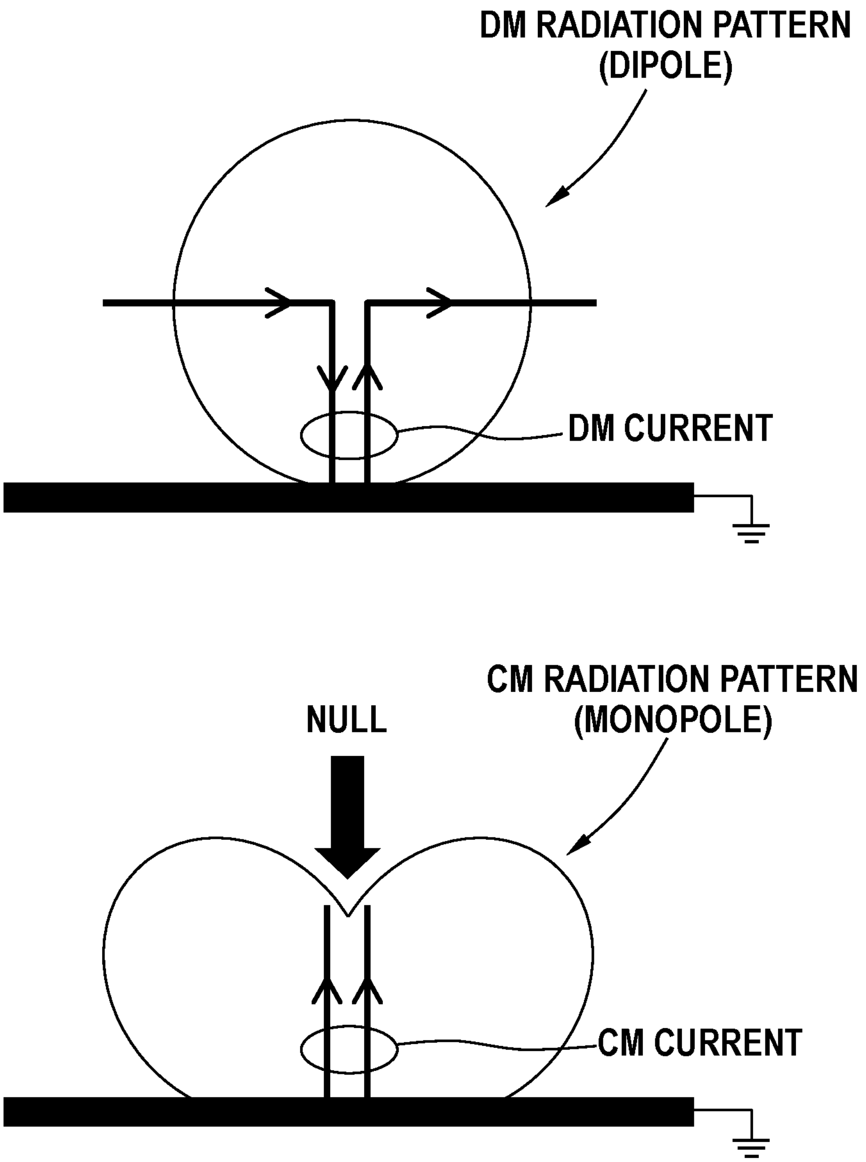
Fig. 1B (Prior Art)
FIG. 1B illustrates radiation patterns of a dipole antenna having a differential mode (DM) and a monopole antenna having a common mode (CM), which when combined together provide a radiation pattern of a conventional box dipole antenna.
Figure 2A:
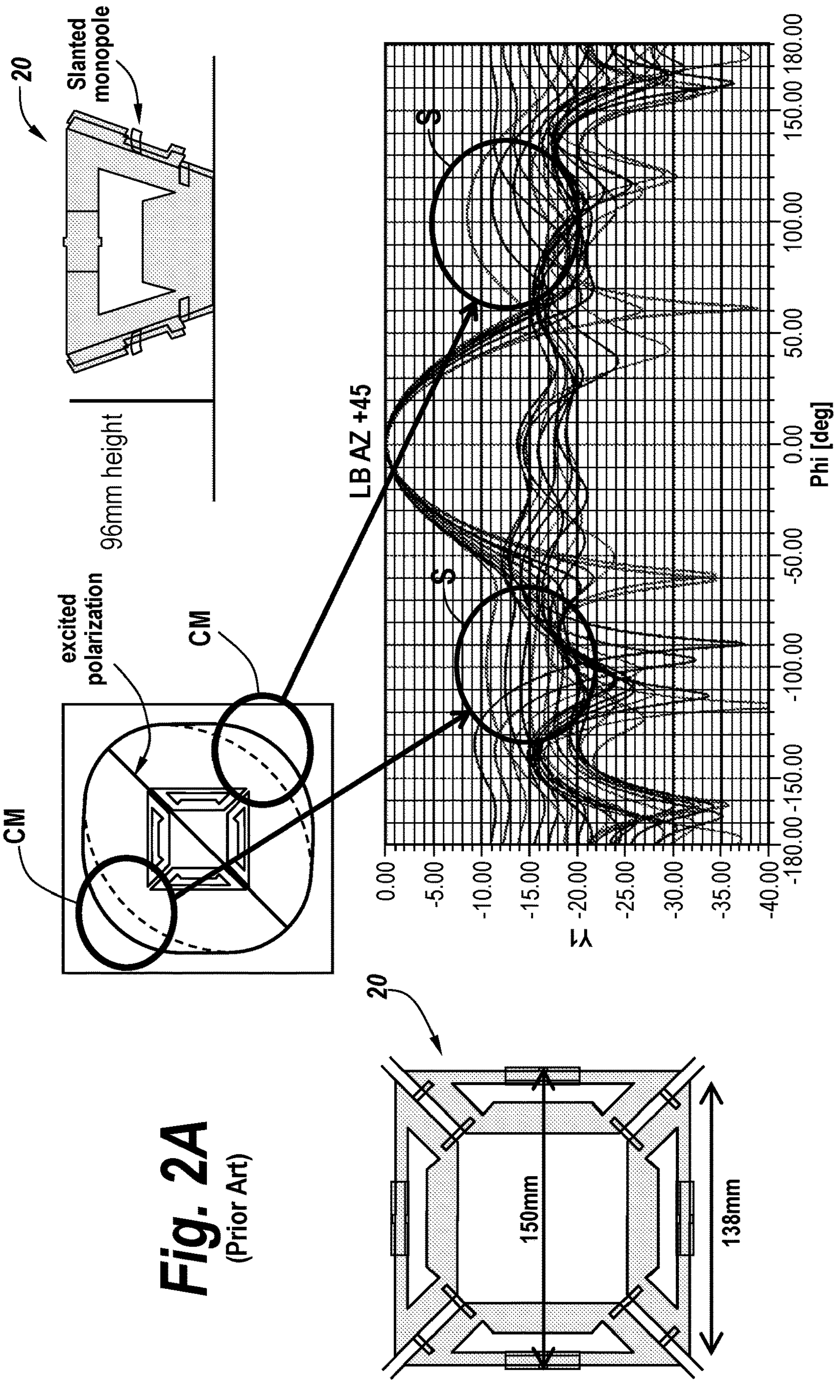
Fig. 2A (Prior Art)
FIG. 2A illustrates a conventional sheet metal box dipole radiating element with slightly slanted corners, and a simulated azimuth radiation pattern having undesired shoulders caused by monopole radiators created by common mode currents on non-excited corners of the box dipole.
Figure 2B:
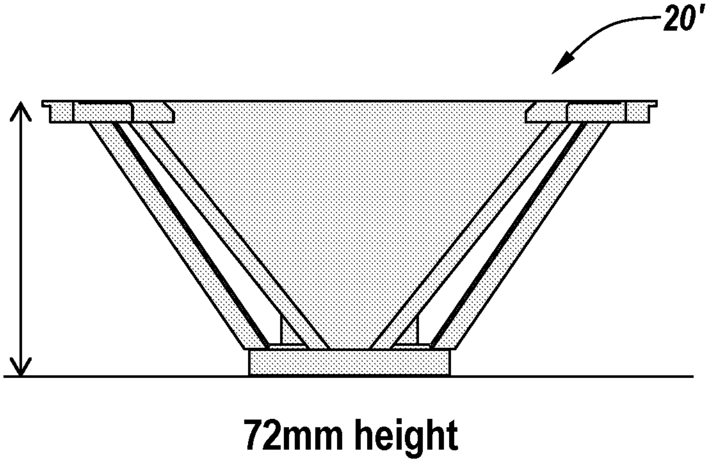
Fig. 2B (Prior Art)
FIG. 2B illustrates a conventional dicasted box dipole radiating element with slightly slanted corners, and a simulated azimuth radiation pattern having undesired shoulders caused by monopole radiators created by common mode currents on non-excited corners of the box dipole.
Figure 2B:
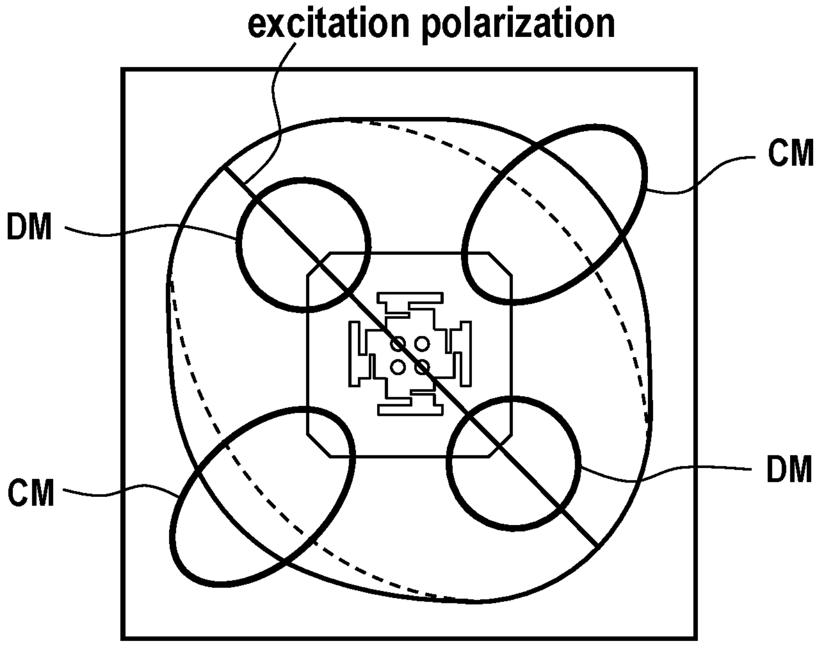
Fig. 2B (Prior Art)

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof. Aspects and elements of all of the embodiments disclosed hereinbelow can be combined in any way and/or combination with aspects or elements of other embodiments to provide a plurality of additional embodiments.

Figure 5:
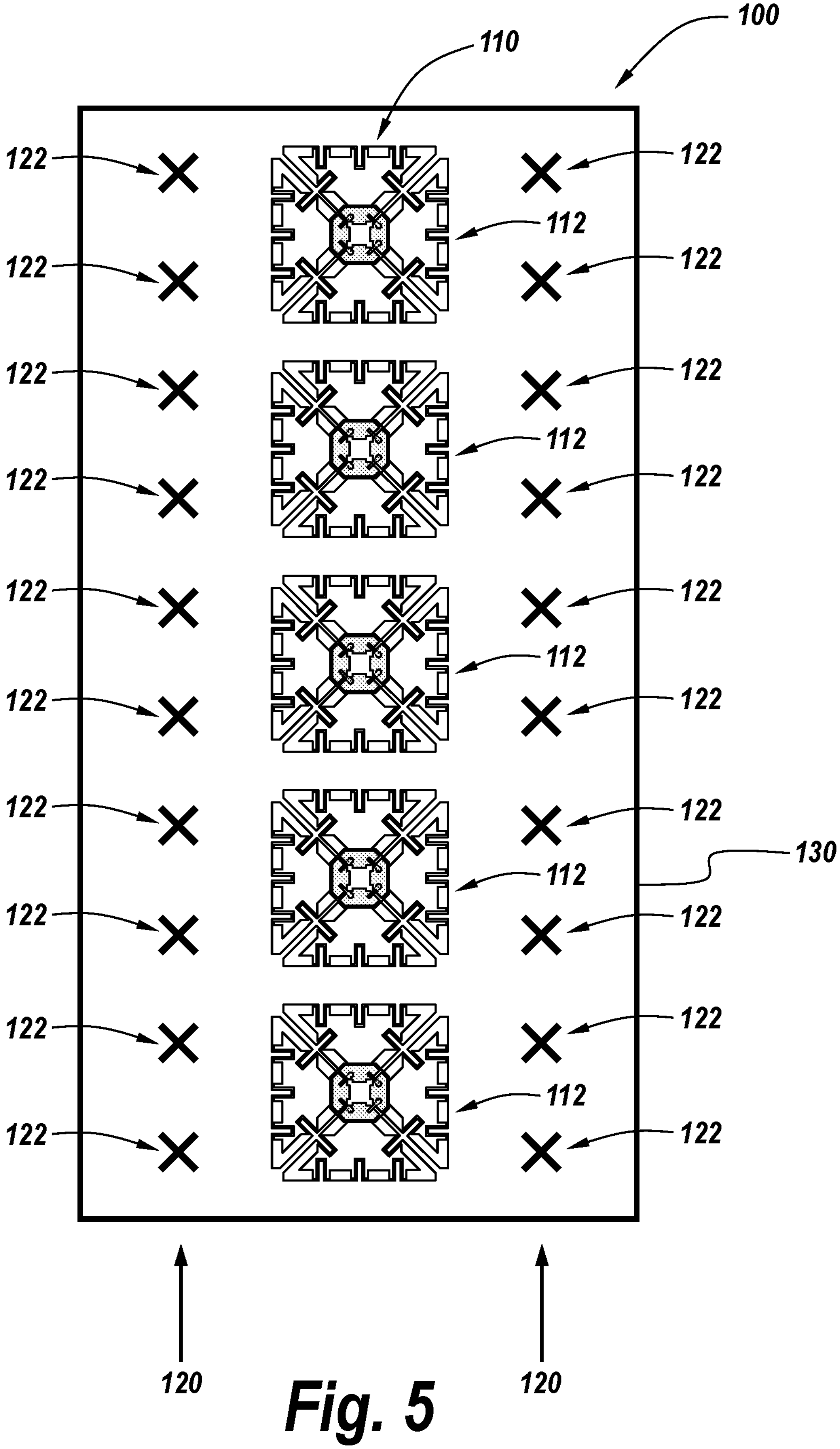
FIG. 5 schematically illustrates a multiband antenna having a linear array of lower-band radiating elements according to embodiments of the invention, and two linear arrays 120 of higher-band radiating elements 122.

FIGS. 3A-3D illustrate a box dipole radiating element 30 that is suitable for use in a base station antenna. The box dipole radiating element 30 is suitable for use, by way of example, as a lower-band radiating element in a multiband base station antenna that includes at least one array of lower-band radiating elements and at least one array of higher-band radiating elements. FIG. 5 schematically illustrates a multiband antenna 100 that includes a linear array 110 of lower-band radiating elements 112, which may be configured as the box dipole radiating element 30, and two linear arrays 120 of higher-band radiating elements 122, which operate in a higher frequency band relative to the box dipole radiating elements 112. All of the radiating elements 112, 122 may extend forwardly from a reflector 130.

The box dipole radiating element 30 is configured to support slant-polarized radiation and, in particular, is configured to transmit and receive RF signals at both a slant −45° polarization and at a slant +45° polarization. As shown in FIGS. 3A-3D, the box dipole radiating element 30 includes a compact quad arrangement of substantially coplanar radiating arms 32*a*-32*d*. As illustrated best by FIG. 4A, the slant-polarized radiation occurs in response to differential-mode currents (A, B) generated along the four outer sides of the quad arrangement of radiating arms 32*a*-32*d*, and in response to common-mode currents (C) generated in substantially the same plane as the differential mode currents relative to a reflector 44 from which the box dipole element extends forwardly. These common-mode currents (C) traverse from one corner of the quad arrangement of radiating arms 32*a*-32*d* to another diametrically opposite corner of the quad arrangement of the radiating arms 32*a*-32*d*, via radially diverging sides DS of the quad arrangement of radiating arms 32*a*-32*d*.

As shown, each of the first through fourth radiating arms 32*a*-32*d* may be configured as a four-sided trapezoidal-shaped radiating arm having a pair of radially diverging sides DS, a longest outermost side LS having ends that intersect the radially diverging sides DS at respective acute angles, and a shortest innermost side SS having ends that intersect the radially diverging sides DS at respective obtuse angles. Moreover, the four longest sides LS of the quad arrangement of radiating arms 32*a*-32*d* may include: (i) first and second opposing sides, which are spaced apart from each other at a first distance, and (ii) third and fourth opposing sides, which are spaced apart from each other at the first distance. Thus, in the illustrated embodiment, the four longest sides LS of the quad arrangement of radiating arms 32*a*-32*d* lie along sides of a rectangle (e.g., square) when viewed from a plan perspective.

The radiating arms may also be configured to provide relatively low-band radiation with high-band cloaking using in-series inductors 34*a*, 34*b* (optional), which are integrated into each of longest sides LS and diverging sides DS of the quad arrangement of radiating arms 32*a*-32*d*. In addition to supporting high-band cloaking, the inductors 34*a*, 34*b* operate to maintain sufficient electrical length of the radiating arms, and thereby contribute to a reduction in overall size of the box dipole radiating element 30.

Figure 3A:
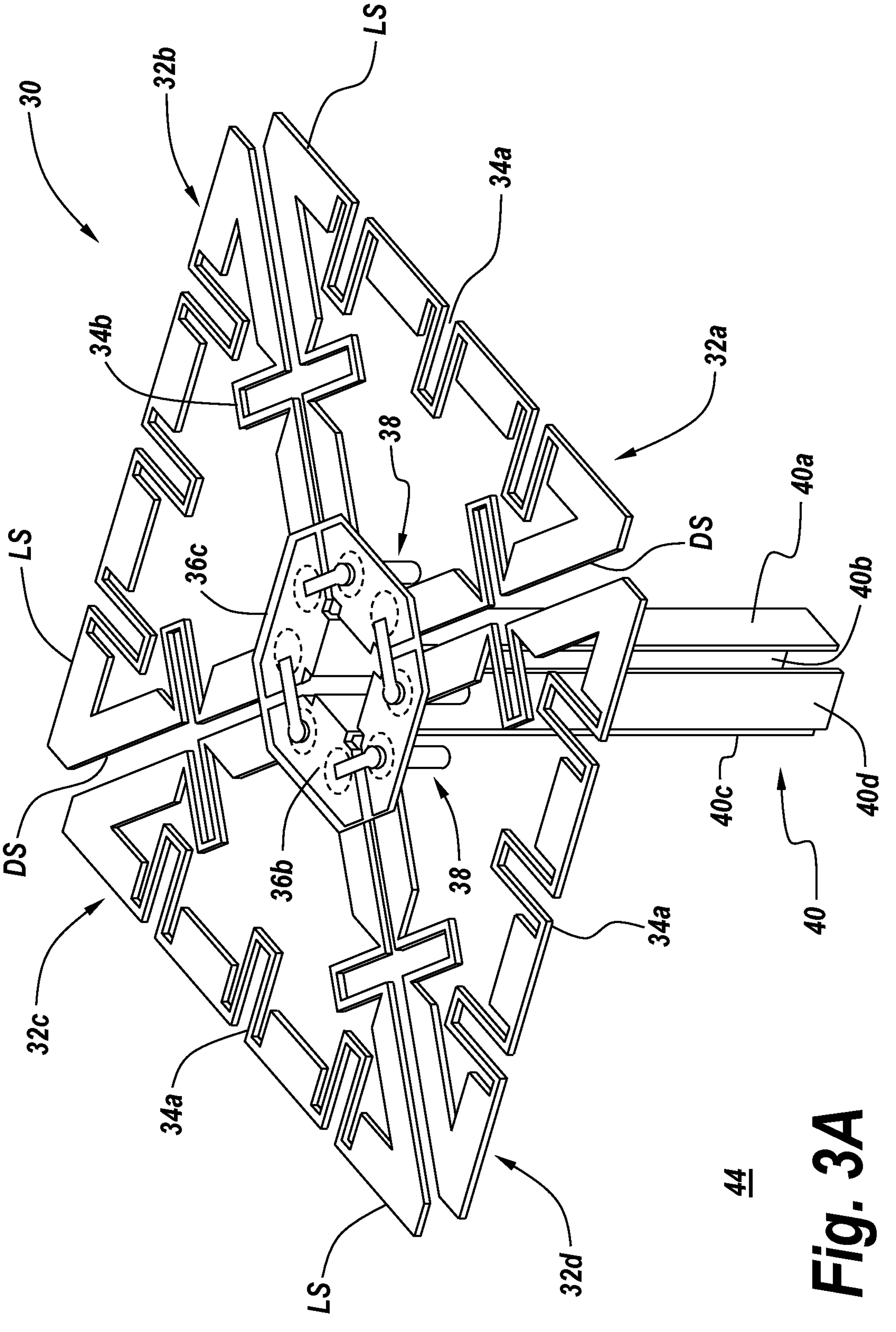
FIG. 3A is a perspective view of a box dipole radiating element according to an embodiment of the invention.
Figure 3B:
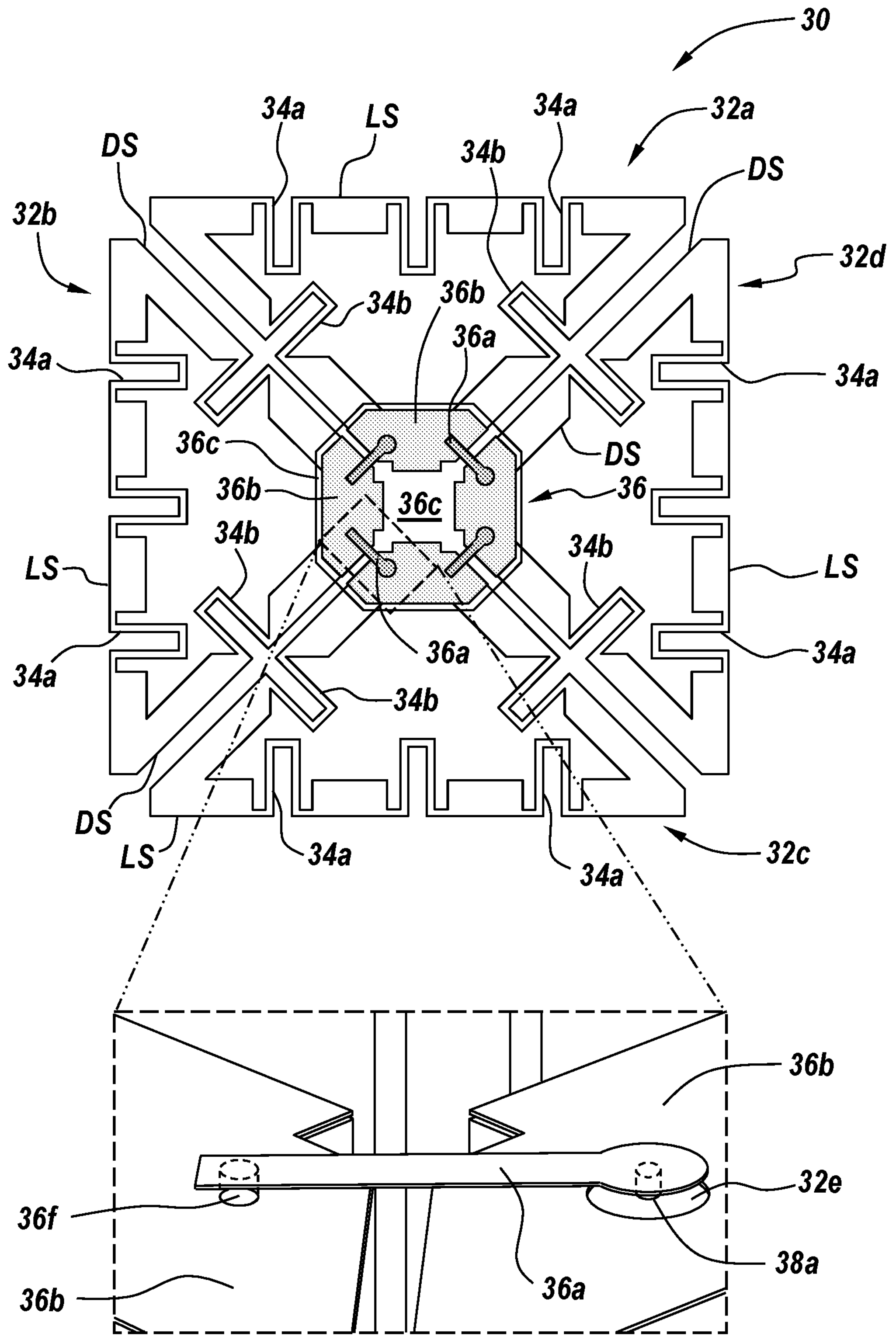
FIG. 3B is a top down plan view of the box dipole radiating element of FIG. 3A with an enlarged perspective view of a portion of a feed signal routing substrate (with the circuit board dielectric layer omitted for clarity), according to an embodiment of the invention.
Figure 3C:
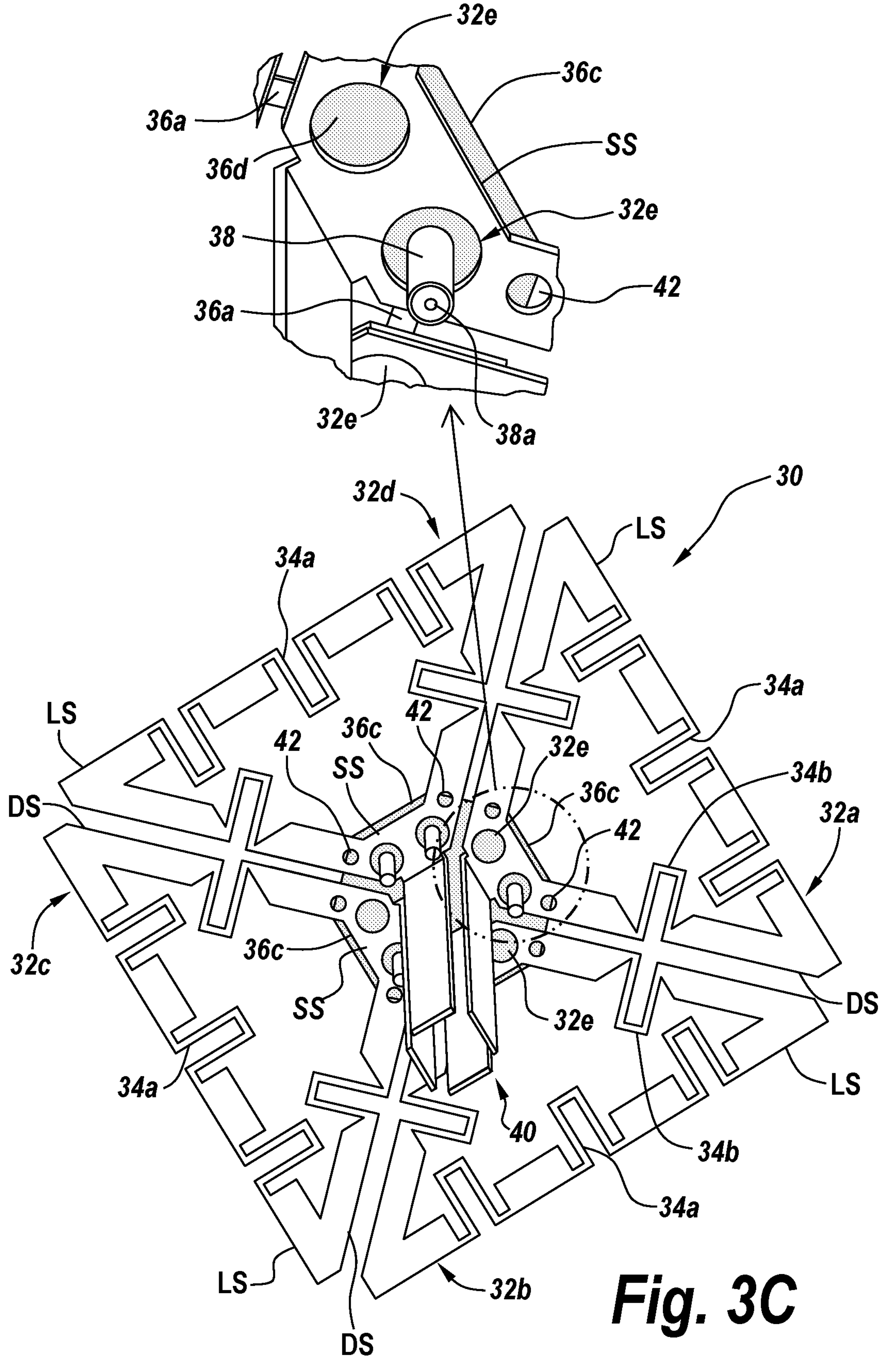
FIG. 3C is a perspective view of a rear facing side of the box dipole radiating element of FIG. 3A, according to an embodiment of the invention.

As shown best by FIG. 3C, each of the shortest sides of the quad arrangement of radiating arms 32*a*-32*d* includes a pair of radiating arm through holes 32*e*, which are sufficiently large to enable the passing of coaxial "feed signal" cables 38 therethrough. In the illustrated embodiment, one coaxial cable (and, in particular, the center conductor of the coaxial cable) extends through one of the two holes 32*e* in the shortest side SS of the first radiating arm 32*a*, the center conductor of one coaxial cable extends through one of the two holes 32*e* in the shortest side SS of the third radiating arm 32*c*, and the respective center conductors of two coaxial cables 38 extend through the pair of holes 32*e* in the shortest side SS of the fourth radiating arm 32*d*.

As will be understood by those skilled in the art, the use of four coaxial cables 38 with shielded and highly isolated center conductors 38*a* can support the efficient transmission of a pair of cross-polarized dipole feed signals (e.g., Feed 1 (0°, 180°) at +45°, and Feed 2 (0°, 180°) at −45°). Although not shown to avoid obscuring rear facing views of the radiating element 30, full length vertical portions of these cables 38 may be affixed to and mechanically supported by respective ones of a plurality of vertical supports 40*a*-40*d* within a feed stalk 40, which is mounted on a forward facing surface of the underlying reflector 44. Advantageously, each vertical support 40*a*-40*d* and corresponding radiating arm 32*a*-32*d* may be identical, and formed from a single piece of stamped metal prior to forming a 90° bend between each vertical support and corresponding radiating arm. In alternative embodiments of the invention (not shown), conventional air strip lines or air microstrip lines that extend across gaps in the feed stalk 40 may be utilized instead of the coaxial cables 38.

FIGS. 3A-3D further illustrate the inclusion of a compact feed signal routing substrate 36, which is supported at a fixed distance (e.g., small air gap) in front of a forward facing surface of the quad arrangement of radiating arms 32*a*-32*d*. This support may be provided by four pairs of dielectric spacers (not shown) having narrowed rear facing protrusions, which may be matingly received within four pairs of support through holes 42 within the diverging sides DS of the radiating arms 32*a*-32*d*, as shown by the perspective view of FIG. 3C. These dielectric spacers may also be utilized to maintain and reinforce the air gap between the radiating arms 32*a*-32*d*. Alternatively, a dielectric spacer may be interposed between the feed signal routing substrate 36 and the radiating arms 32*a*-32*d*.

As illustrated best by FIG. 3B, the feed signal routing substrate 36 may be a square, octagon or other shaped double sided printed circuit board (PCB), and may have a center that is aligned to a center of the quad arrangement of radiating arms 32*a*-32*d*. The feed signal routing substrate 36 includes first through fourth signal traces 36*a* on a forward facing surface of an underlying circuit board 36*c*. As shown best by FIG. 3B, the first signal trace 36*a* is configured to span a gap (i.e., spacing) between adjacent diverging sides DS of the first and second radiating arms 32*a*, 32*b*, the second signal trace 36*a* is configured to span a gap between adjacent diverging sides DS of the second and third radiating arms 32*b*, 32*c*, the third signal trace 36*a* is configured to span a gap between adjacent diverging sides DS of the third and fourth radiating arms 32*c*, 32*d*; and the fourth signal trace 36*a* is configured to span a gap between adjacent diverging sides DS of the fourth and first radiating arms 32*d*, 32*a*. Moreover, the second and fourth signal traces 36*a* are patterned as mirror images of each other (about the center of the radiating element 30) and responsive to a first feed signal (e.g., Feed 1 (0°, 180°)) at a first polarization (e.g., +45°), whereas the first and third signal traces 36*a* are patterned as mirror images of each other (about the center of the radiating element 30) and responsive to a second feed signal (e.g., Feed 2 (0°, 180°)) at a second polarization (e.g., −45°). It should be noted that Feed 1 and Feed 2 may be generated in some embodiments by passing an RF input signal through a power divider that splits the RF input signal into substantially equal magnitude, equal phase RF signals that constitute Feed 1 and Feed 2.

Figure 3D:
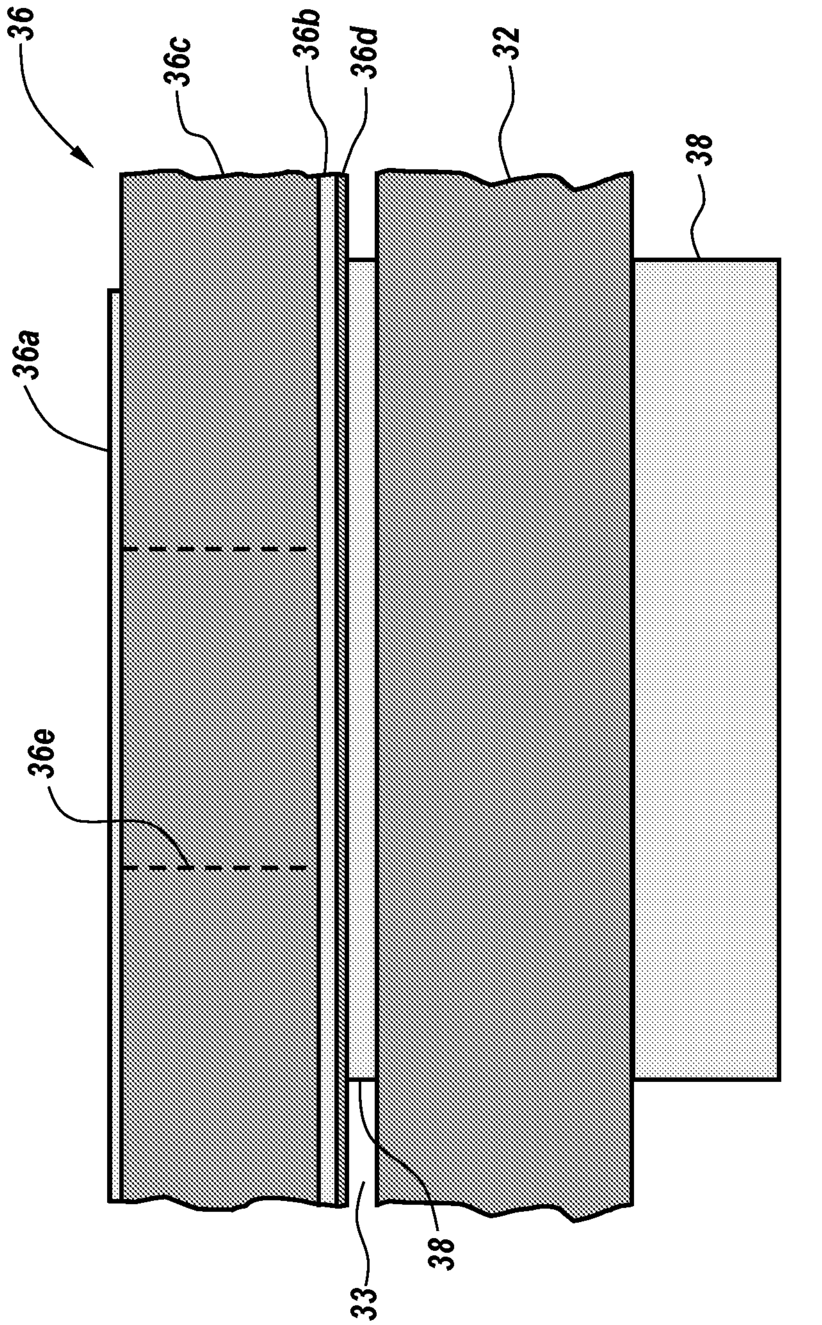
FIG. 3D is an enlarged cross-sectional view of a portion of a feed signal routing substrate, radiating arm and coaxial feed cable, according to an embodiment of the invention.

In addition, as shown best by FIGS. 3B and 3D, each of the first through fourth signal traces 36*a* is electrically connected at a first end thereof to a center conductor 38*a* (of a corresponding coaxial cable 38), which is solder bonded into a plated through hole 36*e* within the circuit board 36*c*. An outer shield of each coaxial cable 38 also terminates at a solder mask 36*d*, which is spaced by the air gap 33 from the forward facing surface of the radiating arms 32, as shown by FIG. 3D.

First through fourth ground plane segments 36*b* are also provided on a rear facing surface of the circuit board 36*c*. A plurality of the first through fourth ground plane segments 36*b* are electrically coupled by a respective conductive through hole 36*f* to a corresponding one of the signal traces, and capacitively coupled across the air gap 33 (and solder mask, not shown) to a respective one of the radiating arms. The inclusion of the first through fourth ground plane segments 36*b* also support termination/soldering of the outer jackets of the coaxial cables 38, which advantageously eliminates any requirement (and expense) of plating within the holes 32*e* within the radiating arms 32.

Figure 4A:
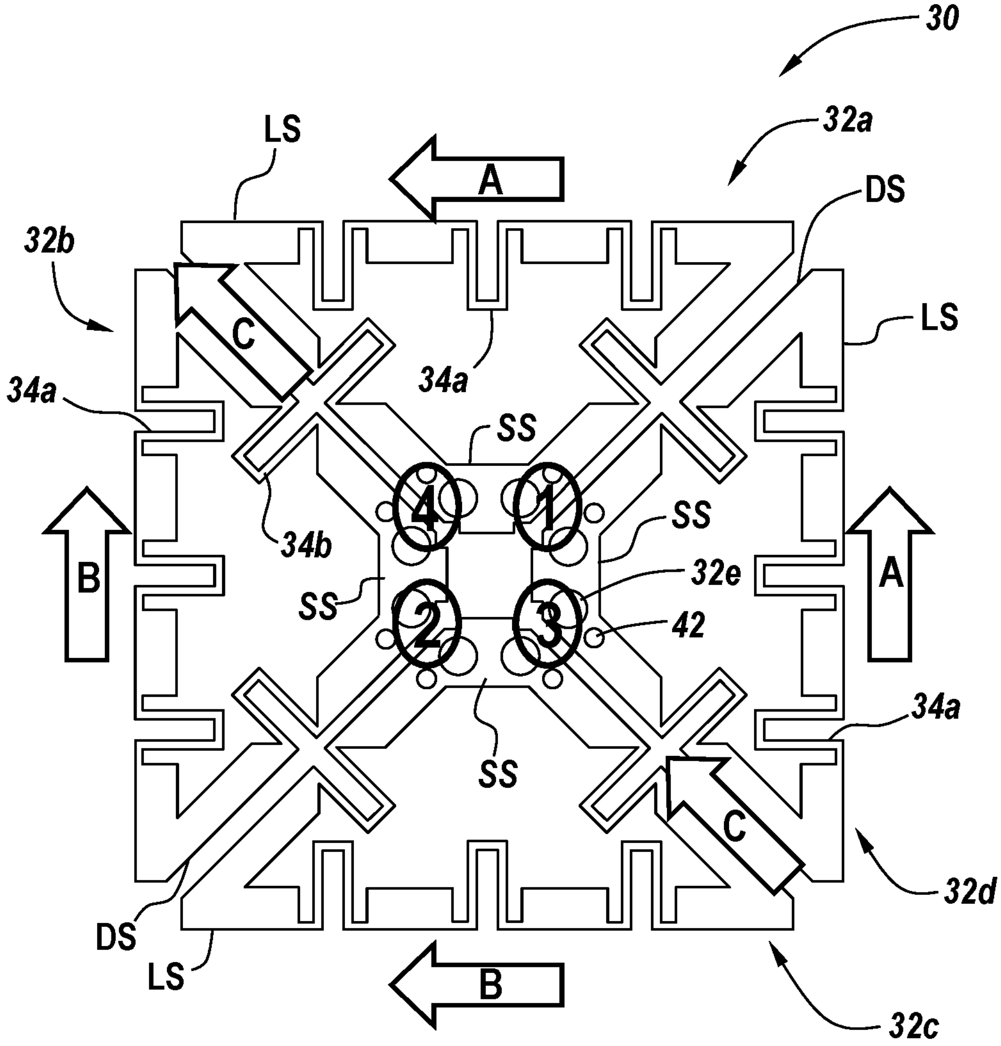
FIG. 4A is a top down plan view of the box dipole radiating element of FIGS. 3B, which illustrates an electric current flow pattern in response to excitation of feeding ports 1 and 2 with a single feed signal (0°, 180°) at a first polarization, according to an embodiment of the present invention.
Figure 4B:
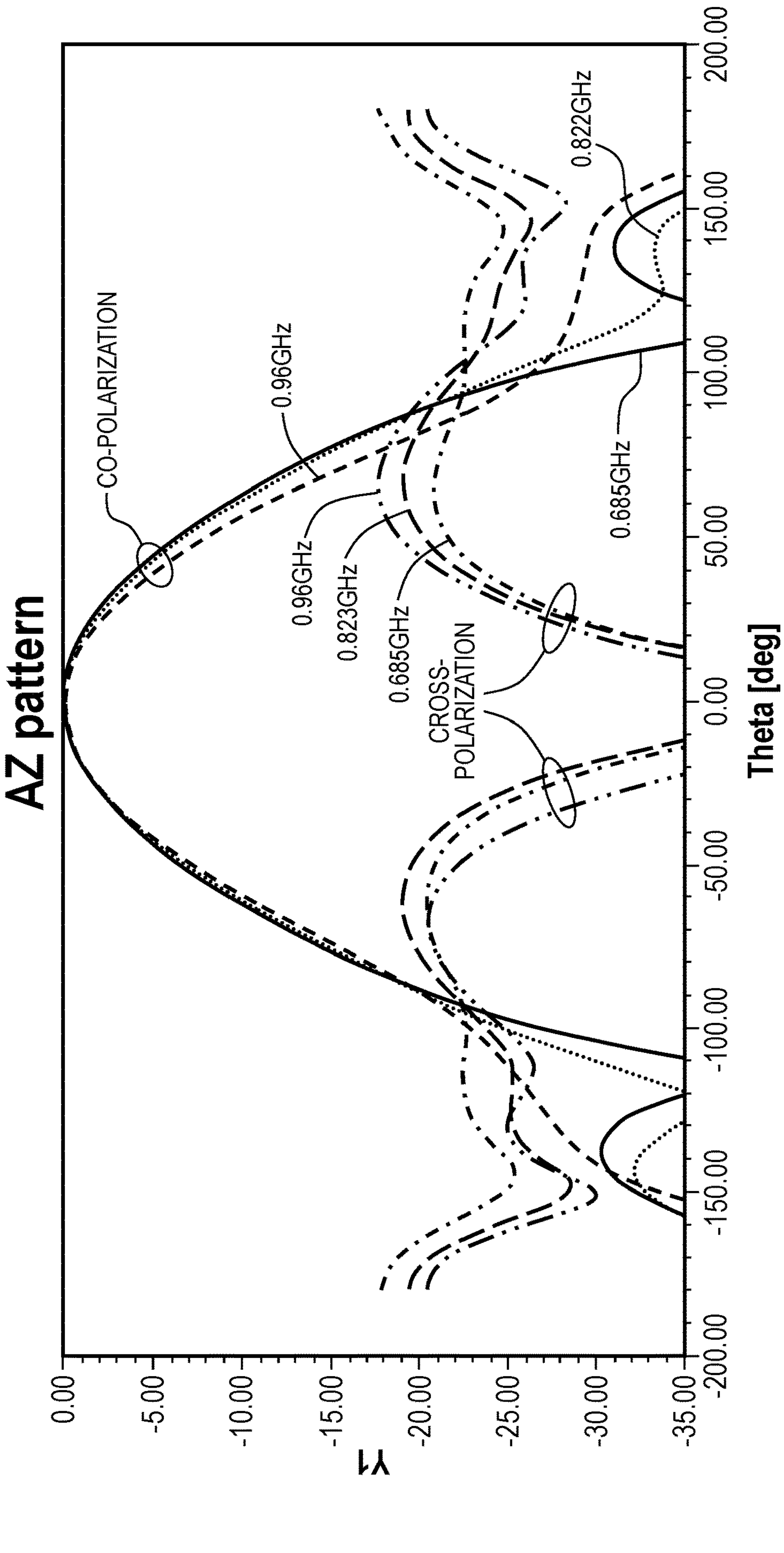
FIG. 4B illustrates simulated azimuth radiation patterns across ±200° (relative to boresight) associated with the box dipole radiating element of FIG. 3A.

Referring now to FIGS. 4A-4B, electrical current flow patterns are provided, which demonstrate the generation of slant-polarized radiation in response to differential-mode currents (A, B) generated along four sides of the quad arrangement of radiating arms 32*a*-32*d*, and in response to common-mode currents (C) generated in substantially the same plane as the differential mode currents. These differential-mode and common-mode currents are responsive to the excitation of feeding "ports" 1 and 2, which correspond to the second and fourth signal traces 36*a* of FIG. 3B, by the first feed signal (e.g., Feed 1 (0°, 180°)) at the first polarization (e.g., +45°). Moreover, as illustrated by FIG. 4B, which shows simulated azimuth radiation patterns across ±200° (relative to boresight) for the radiating element of FIG. 4A, the relative reduction in "shoulders" within the radiating pattern, which are located outside the main lobe in the azimuth plane (AZ), demonstrates improved antenna performance relative to the box dipole radiating elements of FIGS. 1A-1B and 2A-2B.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A box dipole radiating element, comprising:
a quad arrangement of substantially coplanar radiating arms configured to support slant-polarized radiation in response to differential-mode currents generated along four sides thereof and common-mode currents generated in substantially the same plane as the differential mode currents.

2. The radiating element of claim 1, wherein the common-mode currents traverse from one corner of the quad arrangement of radiating arms to another diametrically opposite corner of the quad arrangement of the radiating arms.

3. The radiating element of claim 1, wherein each of the radiating arms has at least three sides.

4. The radiating element of claim 3, wherein each of four outermost sides of the quad arrangement of radiating arms comprises at least one in-series inductor.

5. The radiating element of claim 4, wherein the four outermost sides of the quad arrangement of radiating arms include: (i) first and second opposing sides, which are spaced apart from each other at a first distance, and (ii) third and fourth opposing sides, which are spaced apart from each other at the first distance.

6. The radiating element of claim 4, wherein the four outermost sides of the quad arrangement of radiating arms lie along sides of a rectangle when viewed from a plan perspective.

7. The radiating element of claim 3, wherein three of the four sides of each radiating arm comprises an in-series inductor.

8. The radiating element of claim 3, wherein a shortest side of each of the radiating arms has at least one feed signal through hole therein.

9. The radiating element of claim 8, further comprising a plurality of coaxial cables having center conductors that extend into corresponding ones of the feed signal through holes in the radiating arms.

10. The radiating element of claim 3, wherein each of the radiating arms has a shortest side and a longest side, which extend parallel to each other, and first and second radially diverging sides that intersect respective first and second ends of the shortest side at obtuse angles and intersect respective first and second ends of the longest side at acute angles.

11. A box dipole radiating element, comprising:
a quad arrangement of radiating arms configured to support slant-polarized radiation responsive to differential-mode currents generated along four sides thereof; and
a feed signal routing substrate on portions of forward facing surfaces of first through fourth radiating arms within the quad arrangement, said feed signal routing substrate comprising:
first through fourth signal traces on a first surface thereof; and
first through fourth ground plane segments on a second surface thereof, said first through fourth ground plane segments capacitively coupled to respective ones of the first through fourth radiating arms.

12. The radiating element of claim 11, wherein the first signal trace spans a first gap between the first and second radiating arms; wherein the second signal trace spans a second gap between the second and third radiating arms; wherein the third signal trace spans a third gap between the third and fourth radiating arms; and wherein the fourth signal trace spans a fourth gap between the fourth and first radiating arms.

13. The radiating element of claim 12, wherein each of four outermost sides of the quad arrangement of radiating arms lie along sides of a rectangle when viewed from a plan perspective; and wherein the first gap is between a radially diverging side of the first radiating arm and a radially diverging side of the second radiating arm, which extends generally parallel to the radially diverging side of the first radiating arm.

14. The radiating element of claim 12, wherein an end of the first signal trace is electrically coupled by a plated through hole within the feed signal routing substrate to the second ground plane segment.

15. The radiating element of claim 11, further comprising first through fourth coaxial cables having center conductors electrically coupled to respective ones of the first through fourth signal traces.

16. The radiating element of claim 15, wherein the center conductors are electrically coupled by plated through holes within the feed signal routing substrate to corresponding ones of the first through fourth signal traces.

17. A box dipole radiating element, comprising:
a quad arrangement of radiating arms having four outermost sides that lie along sides of a square when viewed from a plan perspective, and first through fourth pairs of spaced-apart and radially diverging sides that terminate at the four outermost sides; and
a feed signal routing substrate on portions of forward facing surfaces of first through fourth radiating arms within the quad arrangement, said feed signal routing substrate comprising first through fourth signal traces on a major surface thereof, which span gaps between respective ones of the first through fourth pairs of radially diverging sides.

18. The radiating element of claim 17, wherein the quad arrangement of radiating arms are supported in front of a reflector by a feed stalk having a plurality of coaxial cables mounted thereto; wherein the plurality of coaxial cables extend through openings within the quad arrangement of radiating arms; and wherein center conductors within the plurality of coaxial cables are solder bonded into through holes within the feed signal routing substrate.

19. The radiating element of claim 18, wherein the center conductors are electrically connected to respective ones of the first through fourth signal traces.

20. The radiating element of claim 19, further comprising first through fourth ground plane segments, which extend on a rear facing surface of the feed signal routing substrate and are capacitively coupled to respective first through fourth radiating arms within the quad arrangement.

* * * * *